United States Patent Office 3,338,819
Patented Aug. 29, 1967

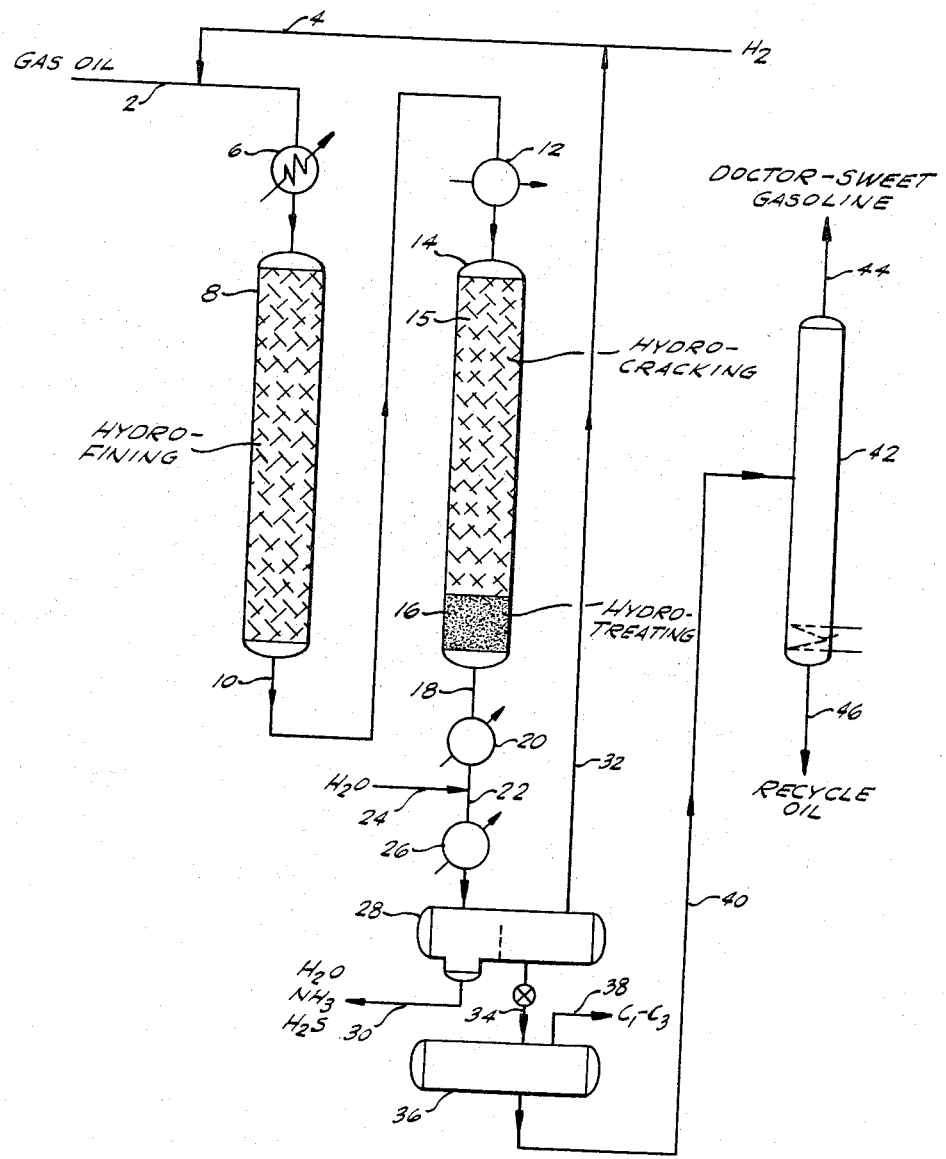

3,338,819
INTEGRAL HYDROCRACKING-HYDROTREATING PROCESS
Frederick C. Wood, Fullerton, Calif., assignor to Union Oil Company of California, Los Angeles, Calif., a corporation of California
Filed June 14, 1965, Ser. No. 463,577
11 Claims. (Cl. 208—97)

ABSTRACT OF THE DISCLOSURE

A method is described for producing a doctor-sweet product in catalytic hydrocracking. Total effluent from a catalytic hydrocracking zone, containing mercaptans synthesized therein, is passed through a post-treating bed of non-cracking hydrogenation catalyst at high space velocities of about 8–20, whereby mercaptans are destroyed and precursor olefins hydrogenated without significant hydrogenation of aromatic hydrocarbons.

Detailed description

This invention relates to the catalytic hydrocracking of high-boiling hydrocarbons to produce therefrom relatively lower boiling hydrocarbons, and is particularly concerned with methods for producing doctor-sweet products from hydrocracking operations carried out in the presence of sulfur. It has recently been discovered that in certain types of hydrocracking operations to be more specifically described hereinafter the hydrocracked products, particularly the lower-boiling fractions thereof, are objectionably contaminated with mercaptans, even in cases where the initial feed to the hydrocracking zone is free of mercaptans. These mercaptans are apparently synthesized during or after the hydrocracking operation by the reaction of olefins with hydrogen sulfide, as exemplified by the equation:

$$CH_2=CH_2 + H_2S \rightleftharpoons CH_3CH_2SH \qquad (1)$$

According to the present invention, it has been found that the production of sour products by hydrocracking can be very simply and economically avoided without resorting to conventional separate post-treatments, by passing the total hydrocracker effluent through a small bed of granular hydrotreating catalyst at substantially the same conditions of pressure and temperature employed in the hydrocracker. The hydrotreating catalyst must be one which has a substantially lower cracking activity than does the cracking base of the hydrocracking catalyst employed. Treatment in this manner is not regarded as a separate post-treatment, for it does not involve intervening cooling, depressuring or condensation, nor does it require separate treating equipment. In a preferred type of operation, a small bed of the required hydrotreating catalyst is simply placed in the hydrocracking reactor at the effluent end thereof, and normally involves no more than about a 5–10% increase in reactor size. The use of a separate hydrotreating reactor is not however precluded, for in some cases it may be desirable to provide for regenerating the hydrocracking catalyst at different time intervals than the hydrotreating catalyst.

The invention is particularly useful in the integral hydrofining-hydrocracking type of operation disclosed in U.S. Patent No. 3,159,568, wherein the initial feedstock is first subjected to a conventional catalytic hydrofining operation to decompose organic sulfur and nitrogen compounds, and total hydrogen sulfide-containing effluent therefrom is then passed through the catalytic hydrocracker. In this type of operation, the effluent from the hydrofiner is normally substantially free of mercaptans, and since the subsequent hydrocracking step is carried out at fairly high hydrogen partial pressures, which would presumably saturate all olefins, it was highly unexpected to find that the light gasoline fractions recovered from the hydrocracker effluent contained anywhere from about 20–200 p.p.m. of mercaptan sulfur. Subsequent investigation showed however, that small amounts of olefins were present in the hydrocracker effluent, sufficient to account for the formation of mercaptans by the mechanism illustrated in Equation 1 above. The formation of sufficient olefins to lead to a doctor-sour product appears to be attributable to the use of low hydrocracking pressures, below about 3,000 p.s.i.g., and/or to the use of hydrocracking catalysts having a high ratio of cracking/hydrogenation activity, such that olefins are formed by cracking reactions at a faster rate than they can be hydrogenated. The problem is not normally encountered at high hydrocracking pressures, or when more conventional hydrocracking catalysts having lower cracking/hydrogenation activity ratios are employed.

The kinetics and thermodynamics involved in the formation of olefins and mercaptans, and in the elimination of mercaptans by the novel process of this invention, are complex, and it is not intended to limit the invention to any theoretical explanation of the results obtained. It would appear however, that the post-hydrotreating technique reduced the concentration of mercaptans primarily by conventional hydrodesulfurization as illustrated by the equation:

$$CH_3CH_2SH + H_2 \rightarrow C_2H_6 + H_2S \qquad (2)$$

and secondarily by hydrogenating olefins, thus preventing further formation of mercaptans. It came as a distinct surprise to find that this desirable result could be obtained without changing the molar concentration of reactants or the basic process conditions, by simply altering the cracking/hydrogenation activity ratio of the catalyst at the effluent end of the reactor.

Another important aspect of the invention resides in maintaining hydrotreating conditions which are selective for the hydrogenation of olefins and the hydrodecomposition of mercaptans, as opposed to the hydrogenation of aromatics. Aside from eliminating the objectionable odor of mercaptans in the product gasolines, a major objective of the process is to produce high octane gasoline. Mercaptan sulfur is more highly objectionable than other forms of sulfur in respect to lead susceptibility, i.e., the response of the gasoline to tetraethyl lead knock rating improvement. By eliminating the mercaptan sulfur in the product, a substantial improvement in lead susceptibility is obtained, other factors being equal. However, this advantage would largely disappear if, in eliminating mercaptans, a significant proportion of aromatic hydrocarbons were concomitantly hydrogenated, since aromatics contribute substantially to high knock ratings.

It is therefore essential to employ hydrotreating condition which will effectively eliminate mercaptans without significant hydrogenation of aromatic hydrocarbons. To accomplish this objection, it has been found that high liquid hourly space velocities, between about 8 and 30, must be maintained in the hydrotreating zone. This factor is, of course, interrelated with the specific hydrogenation activity of the catalyst, the high space velocities being used in conjunction with the more active catalysts, and the lower space velocities in conjunction with the less active catalyst. In any case, however, it is desirable to limit the space velocity to values which are sufficiently low to reduce the mercaptan sulfur content of the 230° F. end-point gasoline product to below the doctor-sweet level, but are sufficiently high that the leaded octane number of the gasoline produced will be at least equal to the leaded octane number of the corresponding gasoline fraction in the effluent from the hydrocracking catalyst bed. To be doctor-sweet and odor-sweet, the light gasoline should contain less than about 5 p.p.m. of mercaptan sulfur, although this figure varies slightly for different gasolines.

Reference is now made to the attached drawing, which is a simplified flow diagram illustrating one modification of the invention. The initial gas oil feedstock is brought in via line 2, mixed with recycle and make-up hydrogen from line 4, preheated to incipient hydrofining temperatures in preheater 6, and then passed directly into hydrofiner 8, where hydrofining proceeds under substantially conventional conditions. Suitable hydrofining catalysts are described more specifically hereinafter; suitable hydrofining process conditions are as follows:

HYDROFINING CONDITIONS

|  | Broad Range | Preferred Range |
| --- | --- | --- |
| Temperature, °F | 600-850 | 650-770 |
| Pressure, p.s.i.g | 400-4,000 | 800-2,500 |
| LHSV | 0.2-10 | 0.8-5 |
| $H_2$/oil ratio, M s.c.f./b | 0.5-20 | 2-12 |

The above conditions are suitably adjusted so as to reduce the organic nitrogen content of the feed to below about 100 p.p.m. and preferably below about 25 p.p.m. Under these conditions, the organic sulfur content will generally be reduced to below about 10 p.p.m.

The total hydrofined product from hydrofiner 8, including ammonia and hydrogen sulfide formed therein, is withdrawn via line 10 and transferred via heat exchanger 12 to hydrocracker-hydrotreater 14. Heat exchanger 12 is for the purpose of suitably adjusting the temperature of feed to the hydrocracking catalyst zone 15; this may require either cooling or heating, depending on the respective hydrofining and hydrocracking temperatures employed. The process conditions in hydrocracking zone 15 are suitably adjusted so as to provide about 20-70% conversion to gasoline per pass, while at the same time permitting relatively long runs between regenerations, i.e. from about 2-12 months or more. For these purposes, it will be understood that pressures in the high range will normally be used in connection with temperatures in the high range, while the lower pressures will normally be used in conjunction with lower temperatures. The range of operative hydrocracking conditions is as follows:

HYDROCRACKING CONDITIONS

|  | Broad Range | Preferred Range |
| --- | --- | --- |
| Temperature, °F | 550-850 | 650-800 |
| Pressure, p.s.i.g | 400-3,000 | 800-2,500 |
| LHSV | 0.5-10 | 1-5 |
| $H_2$/oil ratio, M s.c.f./b | 0.5-20 | 2-12 |

Under the above hydrocracking conditions, and employing hydrocracking catalysts hereinafter described, it is found that objectionable quantities of mercaptans are generated whenever the total weight-ratio of sulfur/feed (including any sulfur contained in the recycle hydrogen employed), is greater than about 0.01 wt. percent, although the problem does not become severe unless more than about 0.1 wt. percent sulfur is present.

The total effluent from hydrocracking catalyst zone 15 passes directly into and through lower hydrotreating catalyst zone 16, where hydrodecomposition of mercaptans and hydrogenation of olefins takes place. As noted above, the conditions of hydrotreating in zone 16 are substantially the same as in hydrocracking zone 15, except that higher space velocities are utilized, ranging between about 8 and 30, preferably about 10 to 20.

Effluent from hydrotreating zone 16 is withdrawn via line 18 and partially cooled and condensed in exchanger 20 to a temperature of e.g. 200-400° F., and mixed in line 22 with wash water injected via line 24. The resulting mixture is then further cooled in exchanger 26 to a temperature of e.g. 50-200° F., and transferred into high-pressure separator 28, from which spent wash water containing dissolved ammonia and ammonium sulfide is withdrawn via line 30. Hydrogen-rich recycle gas is withdrawn via line 32 and recycled to line 2 via line 4. The condensed liquid product is flashed via line 34 into low-pressure separator 36, from which light hydrocarbon gases are exhausted via line 38. Low-pressure liquid condensate is then transferred via line 40 to fractionating column 42, from which doctor-sweet $C_4+$ gasoline is taken overhead via line 44, and unconverted oil boiling above about 350-400° F. is withdrawn as bottoms via line 46. This unconverted oil may be utilized as jet fuel, diesel fuel, etc., or it may be recycled to hydrocracking zone 15 for further conversion to gasoline, or sent to a second hydrocracking stage (not shown) operated substantially in the absence of ammonia, whereby hydrocracking may be carried out at substantially lower temperatures than in zone 15.

HYDROFINING CATALYSTS

Hydrofining catalysts which may be employed in hydrofiner 8 may comprise any of the oxides and/or sulfides of the transitional metals, and especially an oxide or sulfide of a Group VIII metal (particularly cobalt or nickel) mixed with an oxide or sulfide of a Group VI-B metal (preferably molybdenum or tungsten). Such catalysts preferably are supported on an adsorbent carrier in proportions ranging between about 2% and 25% by weight. Suitable carriers include in general the difficulty reducible inorganic oxides, e.g. alumina, silica, zirconia, titania, clays such as bauxite, bentonite, etc. Preferably the carrier should display little or no cracking activity, and hence highly acidic carriers having a Cat-A cracking Activity Index above about 20 are to be avoided. The preferred carrier is activated alumina, and especially activated alumina containing about 3-15% by weight of coprecipitated silica-gel.

The preferred hydrofining catalysts consist of nickel sulfide or oxide plus molybdenum sulfide or oxide supported on silica-stabilized alumina. Compositions containing between about 1% and 5% of Ni, 3% and 20% of Mo, 3% and 15% of $SiO_2$, and the balance $Al_2O_3$, and wherein the atomic ratio of Ni/Mo is between about 0.2 and 4, are specifically contemplated.

HYDROCRACKING CATALYSTS

The hydrocracking catalysts employed herein may consist of any desired combination of a Group VIII metal hydrogenating component deposited upon a solid cracking base having a cracking activity greater than that corresponding to a Cat-A Activity Index of about 40, and preferably greater than about 50. The "Activity Index" of a catalyst is numerically equal to the volume-percent of gasoline produced in the standard Cat-A activity test as described in National Petroleum News, Aug. 2, 1944, vol. 36, p. R-537. The standard conditions of this test are too severe to give an accurate activity evaluation of some of the newer cracking catalysts, e.g. those comprising certain hydrogen or "decationized" molecular sieves to be described hereinafter. In the case of these highly active catalysts, the standard test conditions result in almost complete conversion of the feed to wet gas ($C_1$-$C_4$), with little or no gasoline being produced.

The highly active cracking bases which are most prone to give rise to objectionable mercaptan formation are those which, when subjected to the standard Cat-A activity test, will either produce more than 40-50 volume percent of gasoline (the "Activity Index"), or will produce lesser quantities of gasoline because more than about 40-50% of the feed is converted to $C_1$-$C_4$ hydrocarbons. Both of these alternatives are included herein under the terminology, "activity greater than that corresponding to a Cat-A activity index of 40" (or 50).

Examples of hydrocracking catalyst bases contemplated herein include the more active cogel composites of silica-alumina, silica-magnesia, silica-zirconia, alumina-boria, silica-titania, silica-zirconia-titania, acid treated clays and the like. Acidic metal phosphates such as aluminum phosphtae may also be used. The invention is particularly concerned, however, with the use of hydrocracking catalysts based on zeolitic, crystalline, aluminosilicate molecular sieves having relatively uniform pore diameters of about 6–14 A., wherein the zeolitic cations comprise a substantial proportion of hydrogen ions and/or polyvalent metal ions. These crystalline zeolites may be used as the sole cracking base, or they may be mixed with one or more of the amorphous cracking bases such as silica-alumina cogel. Suitable molecular sieves include for example those of the X, Y or L crystal types.

A particularly active and useful class of zeolite cracking bases are those having a relatively high $SiO_2/Al_2O_3$ mole-ratio, e.g., between about 3 and 10. For maximum activity in converting gas oils to gasoline, the preferred zeolites are those having crystal pore diameters between about 8–12 A., and wherein the $SiO_2/Al_2O_3$ mole-ratio is between about 3 and 6. A prime example of a zeolite falling in this preferred group is the synthetic Y molecular sieve.

The naturally occurring molecular sieve zeolites are normally found in a sodium form, an alkaline earth metal form, or mixed forms. The synthetic molecular sieves normally are prepared in the sodium form. In any case, for use as a cracking base it is preferred that most or all of the original zeolite monovalent metals be ion-exchanged out with a polyvalent metal, or with an ammonium salt followed by heating to decompose the zeolitic ammonium ions, leaving in their place hydrogen ions and/or exchange sites which have actually beam decationized by further removal of water:

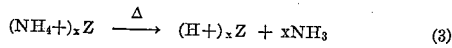

(3)

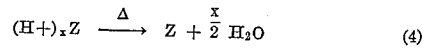

(4)

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms are designated herein as being "metal-cation-deficient." Hydrogen or "decationized" Y sieve zeolites are more particularly described in U.S. Patent No. 3,130,006.

Mixed polyvalent metal-hydrogen zeolites may be prepared by ion exchanging first with an ammonium salt, then partially back exchanging with a polyvalent metal salt, and then calcining. Suitable polyvalent metal cations include magnesium, calcium, zinc, the rare earth metals, chromium, nickel and the like, or in general any of the polyvalent metals of Group I–B through Group VIII. The preferred polyvalent metals are the alkaline earths, zinc, and the rare earths.

The foregoing cracking bases are compounded, as by impregnation, with from about 0.5% to 25% (based on free metal) of a Group VIII hydrogenating metal promoter, e.g., an oxide or sulfide of cobalt, nickel, or the corresponding free metals, or any combination thereof. Alternatively, even smaller proportions, between about 0.05% and 2% of the noble metals platinum, palladium, rhodium or iridium may be employed.

In the case of zeolitic type cracking bases, it is desirable to deposit the hydrogenating metal thereon by ion exchange. This can be accomplished by digesting the zeolite with an aqueous solution of a suitable compound of the desired metal, wherein the metal is present in a cationic form, and then reducing to form the free metal, as described for example in Belgian Patent No. 598,686.

Hydrotreating catalysts

Suitable hydrotreating catalysts for use herein include the metals of Group VI–B and/or Group VIII and their oxides or sulfides, supported on an adsorbent carrier having a Cat–A cracking Activity Index below about 20, and preferably below 15. Suitable carriers include in general the difficultly reducible inorganic oxides, e.g., alumina, silica, zirconia, titania, clays such as bauxite, bentonite, etc. The entire group of hydrofining catalysts described above constitute a preferred group of hydrotreating catalysts, particularly those members which comprise essentially molybdenum sulfide or tungsten sulfide, with or without added cobalt and/or nickel sulfide. These catalysts appear to display an optimum combination of desulfurization activity with a minimum aromatics hydrogenation activity. Other hydrotreating catalysts which may be used to somewhat less advantage include the Group VIII metals such as nickel, platinum, palladium or the like supported on alumina or other non-cracking carrier. Preferably the hydrotreating catalyst is subjected to a presulfiding operation prior to use.

Feedstocks

Feedstocks which may be employed herein include in general any mineral oil fraction boiling above the boiling range of the desired product. For purposes of gasoline production, the primary feedstocks comprise straight run gas oils, coker distillate gas oils, deasphalted crude oils, cycle oils derived from catalytic or thermal cracking operations and the like. These feedstocks may be derived from petroleum crude oils, shale oils, tars and oils, coal hydrogenation products and the like. Specifically, it is preferred to use feedstocks boiling between about 400° F. and 1,000° F., and containing at least about 20 percent by volume of aromatic hydrocarbons. Such feedstocks may contain up to about 2% by weight of nitrogen, and up to about 4% by weight of sulfur. Feedstocks which contain less than about 100 p.p.m. of nitrogen may be subjected directly to hydrocracking without a prehydrofining treatment, but if the nitrogen level is above about 100 p.p.m., it is preferable to subject the feed to prehydrofining to reduce the nitrogen level to below about 50 p.p.m.

The following examples are cited to illustrate the invention and the results obtainable, but are not to be construed as limiting in scope (in all of these examples, a sour recycle gas was employed which contributed about as much sulfur per unit of feed as did the virgin sulfur in the feed):

Example 1

This example illustrates the basic problem of mercaptan synthesis which arises when a hydrotreating catalyst bed is not employed. A gas oil feedstock comprising a blend of California straight-run gas oil and a catalytic cracking cycle oil, was subjected to integral hydrofining-hydrocracking as illustrated in connection with the drawing (but without the hydrotreating catalyst bed 16). The feedstock had a gravity of 24.4° API, a boiling range of 385–850° F., and contained 1.03 wt. percent sulfur and 0.15 wt. percent nitrogen. The hydrofining catalyst employed was the sulfided equivalent of 3% nickel oxide and 15% molybdenum oxide supported on an alumina carrier stabilized by the addition of 5% $SiO_2$, in the form of 1/8" pellets. The hydrocracking catalyst was a copelleted mixture of about 80 wt. percent of a Y molecular sieve zeolite containing 0.5 wt. percent palladium, and 20 wt. percent of an activated alumina binder containing 0.3 wt. percent palladium. The Y molecular sieve cracking base had a $SiO_2/Al_2O_3$ mole-ratio of about 4.7, about 35% of the zeolitic ion exchange capacity thereof being satisfied by magnesium ions (3 wt. percent MgO), about 10% by sodium ions, and the remainder by hydrogen ions. The respective process conditions were as follows:

TABLE 1

|  | Hydrofiner | Hydrocracker |
|---|---|---|
| Temperature, °F. (Av. Bed) | 730 | 735 |
| Pressure, p.s.i.g | 1,730 | 1,730 |
| LHSV | 0.75 | 1.5 |
| H₂/oil, s.c.f./b | 5,500 | 7,500 |

The light gasoline fraction (50–230° F. boiling range) recovered from the hydrocracking step was found to contain about 40 p.p.m. of mercaptan sulfur and had an octane number of 96.2 (F–1 plus 3 ml. TEL). The 230–400° F. boiling range gasoline had a leaded octane number of 84.1.

The Y molecular sieve hydrocracking catalyst base employed in this example, when subjected to the standard Cat–A cracking activity test, gives substantially complete conversion of the feed to $C_1$–$C_4$ gases, with no measurable gasoline production. Its cracking activity was thus far higher than the activity corresponding to an Activity Index of 50.

In another hydrocracking operation using the same catalyst, but a feed having a 400–632° F. boiling range and containing 0.73 wt. percent sulfur, and operating at 750 p.s.i.g. and 660° F., the mercaptan content of the light gasoline was 400–500 p.p.m., thus demonstrating that low hydrocracking pressures are a principal factor in mercaptan formation.

*Example II*

Another hydrofining-hydrocracking run was carried out using the same feedstock, catalysts and essentially the same conditions described in the first part of Example I, except that a small bed of a molybdena-alumina catalyst (11 wt. percent $MoO_3$; 5 wt. percent $SiO_2$) was placed in the hydrocracker at the effluent end thereof, sufficient to provide a liquid hourly space velocity of 15 with respect thereto. In this case, the 50–230° F. boiling-range gasoline product was found to contain only 2 p.p.m. of mercaptan sulfur, and had a leaded octane number of 96.8. Thus, a doctor-sweet light gasoline was obtained with an actual increase in octane number. The 230–400° F. boiling-range gasoline had a leaded octane number of 87.5.

*Example III*

Another hydrofining-hydrocracking run was carried out as described in Example II with the exception that the hydrotreating catalyst was a nickel-molybdenum-alumina hydrofining catalyst identical to the initial hydrofining catalyst described in Example I. The liquid hourly space velocity with respect to the hydrotreating catalyst was 15, and in this case, the 50–230° F. boiling-range gasoline obtained over a period of several days varied between 0.8 and 3.3 p.p.m. in mercaptan sulfur content. The leaded octane number of this light gasoline was 96.6, and of the 230–400° F. fraction, 87.5.

*Example IV*

Another hydrofining-hydrocracking-hydrotreating run was carried out as described in the foregoing examples, using a less refractory feedstock containing only 0.35 wt. percent sulfur, and using a 0.5 wt. percent platinum-on-alumina hydrotreating catalyst. The liquid hourly space velocity over the hydrotreating catalyst was 15, and in this case the 50–230° F. gasoline contained only 2 p.p.m. of mercaptan sulfur. Without the hydrotreating bed, this feedstock gives a 50–230° F. boiling-range gasoline containing about 15–20 p.p.m. of mercaptan sulfur.

*Example V*

Another hydrofining-hydrocracking run was carried out as described in Example I (no hydrotreating), except that another gas oil feedstock was used having an API gravity of 29.6°, a boiling range of 386–740° F., containing 0.46 wt. percent sulfur and 0.041 wt. percent nitrogen. In this case, unconverted oil boiling above 400° F. was recycled to the hydrocracking zone, resulting in a total feed sulfur content of 0.3 wt. percent. Under these conditions, a 50–230° F. boiling range gasoline was recovered containing 12 p.p.m. of mercaptan sulfur, and having a leaded octane number of 96.3.

*Example VI*

The procedure of Example V was repeated with the exception that after the hydrocracking catalyst bed, a hydrotreating catalyst was employed comprising 0.5 wt. percent palladium on activated alumina, the space velocity with respect to the hydrotreating catalyst being 20. In this case, the 50–230° F. boiling range gasoline contained only 2–3 p.p.m. of mercaptan sulfur, and had a leaded octane number of 96.9. Substantially identical results were obtained when a bed of 0.5 wt. percent platinum on alumina was substituted for the palladium-alumina hydrotreating catalyst.

For purposes of comparison, the significant results of all of the foregoing examples are summarized in the following table:

TABLE 2

| Example | Feed S, Wt. percent | Hydrotreating | | 50–230° F. gasoline product | |
|---|---|---|---|---|---|
| | | Catalyst | LHSV | Merc. S, p.p.m. | Octane No. (F–1–3 ml. TEL) |
| 1 | 1.03 | None | | 40 | 96.2 |
| 2 | 1.03 | Mo-Al₂O₃ | 15 | 2 | 95.8 |
| 3 | 1.03 | Ni-Mo-Al₂O₃ | 15 | 0.8–3.3 | 96.6 |
| 4 | 0.35 | Pt-Al₂O₃ | 15 | 2 | |
| | 0.35 | None | | 15–20 | 96.3 |
| 5 | 0.3 | ----do---- | | 12 | 95.9 |
| 6 | 0.3 | Pd-Al₂O₃ | 20 | 2–3 | 96.9 |
| | 0.3 | Or Pt-Al₂O₃ | 20 | 2–3 | |

Results substantially similar to those described in the above examples are obtained when other feedstocks and catalysts within the purview of this invention are substituted therein. It is not intended that the invention should be limited to non-essential details described herein, since many variations may be made by those skilled in the art without departing from the scope or spirit of the following claims:

I claim:
1. In a catalytic hydrocracking process wherein a distillate hydrocarbon feedstock in admixture with hydrogen and hydrogen sulfide is contacted with an active hydrocracking catalyst comprising a Group VIII metal hydrogenating component supported on a solid refractory cracking base having a cracking activity greater than that corresponding to a Cat–A Activity Index of 40, said contacting being carried out at elevated temperatures and pressures between about 400 and 3,000 p.s.i.g., to give a substantial conversion to lower boiling hydrocarbons, and wherein said lower boiling hydrocarbons normally contain mercaptans synthesized during said hydrocracking, the improved method for recovering a doctor-sweep hydrocracked product, which comprises passing total sulfur-containing effluent from said hydrocracking, at substantially hydrocracking temperatures and pressures, through a bed of a Group VI-B and/or Group VIII metal sulfide hydrotreating catalyst supported on an adsorbent carrier having a Cat-A cracking Activity Index below about 20, at a liquid hourly space velocity between about 8 and 30, and recovering from said contacting a doctor-sweet low-boiling hydrocarbon product.

2. A process as defined in claim 1 wherein said hydrocracking catalyst comprises a minor proportion of a Group VIII noble metal hydrogenation component deposited upon a molecular sieve cracking base wherein the zeolitic cations thereof are mainly hydrogen ions and/or polyvalent metal ions.

3. A process as defined in claim 1 wherein said hydrotreating catalyst comprises a Group VI-B metal sulfide supported on an adsorbent carrier which is essentially activated alumina.

4. A process for the manufacture of doctor-sweet, high-octane gasolines by hydrocracking sulfur-containing mineral oil distillate feedstocks, which comprises:
 (1) subjecting said feedstock to catalytic hydrocracking at a temperature between about 550 and 850° F. and a pressure between about 400 and 3,000 p.s.i.g., in the presence of total sulfur amounting to at least about 0.01 wt. percent of the feedstock, in the presence of a hydrocracking catalyst comprising a Group VIII metal hydrogenating component supported on a solid refractory cracking base having a cracking activity greater than that corresponding to a Cat-A Activity Index of 40, thereby producing a gasoline product normally contaminated with more than about 5 p.p.m. of mercaptan sulfur; and
 (2) passing total sulfur-containing effluent from said hydrocracking step through a bed of hydrotreating catalyst under conditions of temperature and pressure within the ranges specified for said hydrocracking step, and at a liquid hourly space velocity between about 8 and 30, said hydrotreating catalyst comprising a minor proportion of a Group VI-B and/or Group VIII metal sulfide supported on an adsorbent carrier having a Cat-A cracking Activity Index below about 20, and recovering from said contacting a doctor-sweet gasoline product having a leaded octane number at least equal to the leaded octane number of the corresponding gasoline fraction in the effluent from said hydrocracking step.

5. A process as defined in claim 4 wherein said hydrocracking catalyst comprises a minor proportion of a Group VIII noble metal hydrogenation component deposited upon a molecular sieve cracking base wherein the zeolitic cations thereof are mainly hydrogen ions and/or polyvalent metal ions.

6. A process as defined in claim 4 wherein said hydrotreating catalyst comprises a Group VI-B metal sulfide supported on an adsorbent carrier which is essentially activated alumina.

7. An integral hydrofining-hydrocracking-hydrotreating process for converting sulfur- and nitrogen-contaminated gas oil feedstocks to high-octane, doctor-sweet gasoline, which comprises:
 (1) subjecting said feedstock in admixture with hydrogen to catalytic hydrofining at temperatures between about 600 and 850° F. and pressures between about 400 and 3,000 p.s.i.g., in the presence of a hydrofining catalyst comprising a Group VI-B and/or Group VIII metal sulfide supported on an adsorbent carrier having a Cat-A cracking Activity Index below about 20, to thereby convert organic nitrogen and sulfur compounds to ammonia and hydrogen sulfide without substantial cracking of hydrocarbons;
 (2) subjecting total effluent from said hydrofining step to catalytic hydrocracking at a temperature between about 550 and 850° F. and a pressure between about 400 and 3,000 p.s.i.g., in the presence of total sulfur amounting to at least about 0.01 wt. percent of the feedstock, in the presence of a hydrocracking catalyst comprising a Group VIII metal hydrogenating component supported on a solid refractory cracking base having a cracking activity greater than that corresponding to a Cat-A Activity Index of 40, thereby producing a gasoline product normally contaminated with more than about 5 p.p.m. of mercaptan sulfur; and
 (3) passing total sulfur-containing effluent from said hydrocracking step through a bed of hydrotreating catalyst under conditions of temperature and pressure within the ranges specified for said hydrocracking step, and at a liquid hourly space velocity between about 8 and 30, said hydrotreating catalyst comprising a minor proportion of a Group VI-B and/or Group VIII metal sulfide supported on an adsorbent carrier having a Cat-A cracking Activity Index below about 20, and recovering from said contacting a doctor-sweet gasoline product having a leaded octane number at least equal to the leaded octane number of the corresponding gasoline fraction in the effluent from said hydrocracking step.

8. A process as defined in claim 7 wherein said hydrofining catalyst employed in step 1 comprises nickel sulfide plus molybdenum sulfide supported on a carrier which is essentially activated alumina.

9. A process as defined in claim 7 wherein said hydrocracking catalyst comprises a minor proportion of a Group VIII noble metal hydrogenation component deposited upon a molecular sieve cracking base wherein the zeolitic cations thereof are mainly hydrogen ions and/or polyvalent metal ions.

10. A process as defined in claim 1 wherein said hydrotreating catalyst comprises a Group VI-B metal sulfide supported on an adsorbent carrier which is essentially activated alumina.

11. A process as defined in claim 7 wherein said hydrofining catalyst and said hydrotreating catalyst each comprise a Group VI-B metal sulfide supported on an adsorbent carrier which is essentially activated alumina.

References Cited

UNITED STATES PATENTS 2,987,468  6/1961  Chervenak _____ 208—97
3,132,089  5/1964  Hass et al. _____ 208—89

DELBERT E. GANTZ, *Primary Examiner.*
S. P. JONES, *Assistant Examiner.*